INVENTOR.
Sarkis Barkhoudarian
BY
Hugh L. Fisher
ATTORNEY

United States Patent Office 3,528,092
Patented Sept. 8, 1970

3,528,092
ELECTROMAGNETIC FORMING METHOD AND APPARATUS
Sarkis Barkhoudarian, Warren, Mich., assignor to General Motors Corporation, Detroit, Mich., a corporation of Delaware
Filed Jan. 26, 1968, Ser. No. 700,813
Int. Cl. B23k *21/00*
U.S. Cl. 228—3        1 Claim

ABSTRACT OF THE DISCLOSURE

Electromagnetic forming method and apparatus for joining a strip workpiece to the inner surface of a hollow member utilizing a disposable forming coil which comprises the strip workpiece.

---

This invention relates to an improved method and apparatus for electromagnetic forming, and more particularly to electromagnetic forming apparatus including a disposable forming coil which becomes a workpiece and to a method for electromagnetically joining a strip workpiece to the inner surface of a hollow member utilizing a disposable forming coil which comprises the strip workpiece.

In the electromagnetic forming process, a forming coil is positioned adjacent a conductive workpiece in the area to be formed. The forming coil is energized by a high energy current pulse so as to generate a high intensity magnetic field which induces a large current in the conductive workpiece. The magnetic field interacts with the induced current in the conductive workpiece and the resulting magnetic force deforms the workpiece.

One useful application of the electromagnetic forming process is in joining a strip workpiece to the inner surface of a hollow member. It is present practice to shape the strip workpiece into a desired expandable configuration, to insert the shaped workpiece within the hollow member, to position an electromagnetic forming coil within the shaped workpiece, and to energize the forming coil so as to generate a magnetic force which causes the shaped workpiece to expand against and become permanently joined to the inner surface of the hollow member.

As can be appreciated, such an involved procedure requires both an intricate forming coil and a complicated fixture in order to effectively position the shaped workpiece and the forming coil within the hollow member. The necessity of this elaborate equipment often makes the electromagnetic forming process disadvantageous for this type of manufacturing, especially in very low volume applications.

Accordingly, it is a principal object of this invention to provide an electromagnetic forming method and apparatus including a disposable forming coil which becomes a workpiece. It is another principal object of this invention to provide an electromagnetic forming method and apparatus for joining a strip workpiece to the inner surface of a hollow member utilizing a disposable forming coil which comprises the strip workpiece.

It is a more specific object of this invention to provide electromagnetic forming apparatus for joining a strip workpiece to the inner surface of a hollow member including a disposable forming coil which comprises the strip workpiece and which is electromagnetically expanded against the inner surface of the hollow member. It is another specific object of this invention to provide electromagnetic forming apparatus including a disposable forming coil having the proper coil characteristics to facilitate electromagnetic forming and the proper workpiece characteristics to form a useful workpiece. In order to accomplish these objects, the preferred embodiment of the inventive apparatus comprehends a disposable forming coil which is comprised of a composite piece including a continuous conductive strip which is folded upon itself so as to form two spaced conductive layers which are isolated from each other by an insulating layer. The disposable forming coil is fashioned into an expandable configuration and positioned within the hollow member. A current pulse source is provided to appropriately energize the conductive layers of the disposable forming coil so as to cause the disposable forming coil to expand against the inner surface of the hollow member.

It is a further specific object of this invention to provide a method for electromagnetically joining a strip workpiece to the inner surface of a hollow member utilizing a disposable forming coil which comprises the strip workpiece. In order to achieve this object, the preferred embodiment of the inventive method contemplates laying a strip of insulating material over approximately half the length of a strip of conductive material and folding the conductive strip end to end upon itself so as to form a composite piece having two conductive layers which are separated by an insulating layer. The composite piece is shaped into an expandable configuration so as to form a disposable forming coil which comprises the strip workpiece and which is positioned within the hollow member. Finally, the conductive layers of the disposable forming coil are energized so as to generate a magnetic force causing the disposable forming coil to expand against and become permanently joined to the inner surface of the hollow member.

These and other objects and advantages of the invention will become more apparent by reference to the following detailed description of the preferred embodiments when considered in conjunction with the drawing, in which.

Figure 1:
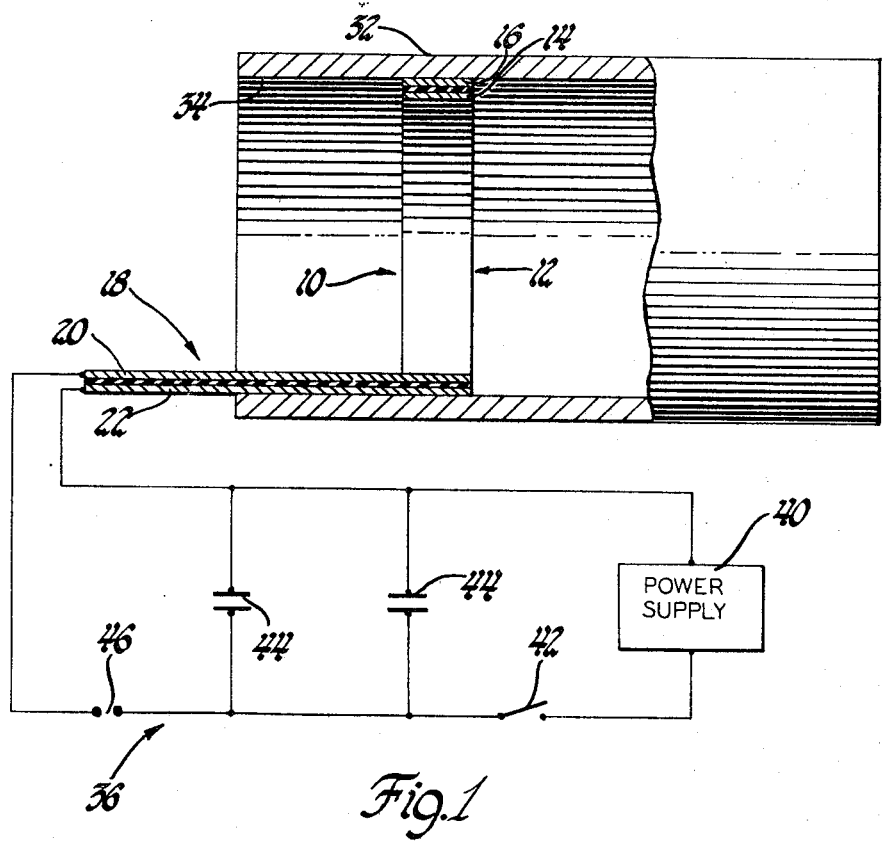
FIG. 1 is a partial cross-sectional view showing an arrangement for practicing the inventive method and including an annular embodiment of the inventive disposable forming coil.
Figures 2, 3:
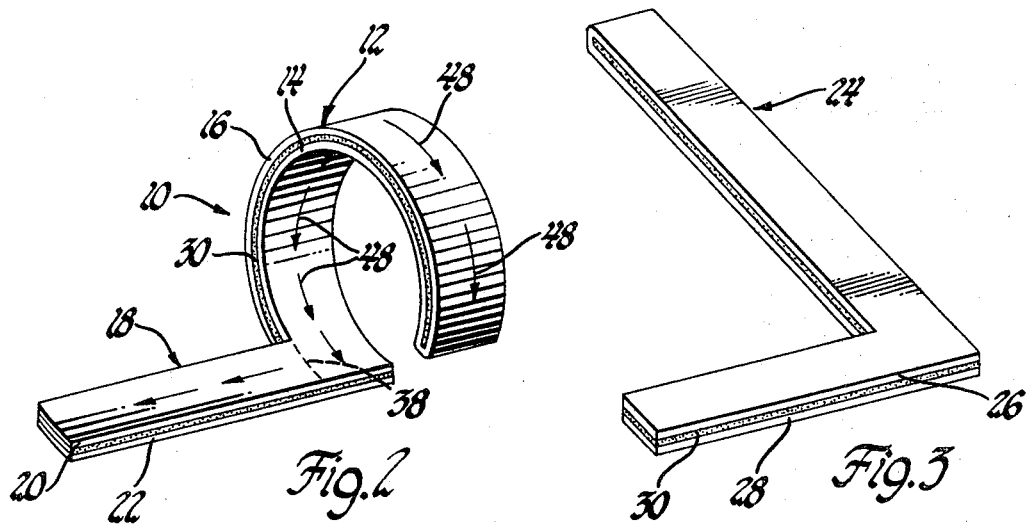
FIG. 2 is a perspective view showing the annular embodiment of the inventive disposable forming coil illustrated in FIG. 1.
FIG. 3 is a perspective view showing the composite piece from which the annular embodiment of the inventive disposable forming coil illustrated in FIGS. 1 and 2 is fashioned.

The inventive disposable forming coil is illustrated in FIG. 2 in the preferred embodiment, an annular configuration 10 having a workpiece portion 12 including two concentric, radially spaced, and electrically isolated C-shaped conductive legs 14 and 16, and a terminal portion 18 including a pair of electrical terminals 20 and 22 adapted to be connected to a current pulse source such as that shown in FIG. 1. The annular forming coil 10 is fashioned from a composite piece 24, shown in FIG. 3, having two conductive layers 26 and 28 which are separated by an insulating layer 30. The composite piece 24 is formed by laying a strip of insulating material over approximately half the length of a symmetrical strip of conductive material and folding the conductive strip end to end upon itself. The original shape of the composite piece is largely dependent upon the desired final configuration of the disposable forming coil.

The precise materials used to make the disposable forming coil are determined by the particular coil characteristics and workpiece characteristics necessary for the desired application. For instance, one possible use of the annular forming coil 10 is as a sleeve bearing. In such an application, the conductive layers 26 and 28 are preferably made of a relatively soft metallic material, such as copper or brass, possessing the required strength to serve as a bearing surface and having the necessary conductivity to facilitate electromagnetic forming. The insulating layer 30 is preferably made of a flexible material, for example a plastic such as Mylar.

FIG. 1 illustrates an arrangement for practicing the inventive method. The annular forming coil 10 is substantially coaxially disposed within a tubular member 32 having an inner surface 34. The electrical terminals 20 and 22 of the terminal portion 18 are connected to a current pulse source 36. After the desired electromagnetic forming has been accomplished, the terminal portion 18 may be detached from the workpiece portion 12 by cutting it off along dotted line 38 as shown in FIG. 2. Indeed, the terminal portion 18 is not essential to the annular forming coil 10 and the current pulse source 36 could be directly connected to the C-shaped conductive legs 14 and 16 of the workpiece portion 12.

The current pulse source 36 includes a high voltage power supply 40, a manually operable power switch 42, a capacitor bank 44, and a spark gap 46. As will be appreciated, various other types of current pulse sources may be employed. For example, the capacitor bank 44 may be replaced by a motor-generator set and the spark gap 46 may be replaced by a thyratron or an ignition. The output of the current pulse source 36 is connected to the input terminals 20 and 22 of the terminal portion 18 of the annular forming coil 10.

In operation, when the manually operable power switch 42 is closed, current at the voltage of the power supply 40, for example 10 kilovolts, is supplied to the capacitor bank 44. The capacitor bank 44 then charges to some predetermined voltage at which the spark gap 46 ionizes and becomes conductive. As the spark gap 46 breaks down, a high energy current pulse of short duration, for instance 100,000 amperes for thirty microseconds, is supplied to the annular forming coil 10 in the direction indicated by the arrows 48 in FIG. 2. This high energy current pulse generates a very intense magnetic field about each of the conductive legs 14 and 16 in the workpiece portion 12 of the annular forming coil 10. The resulting magnetic forces tend to separate the conductive legs 14 and 16, pulling the outer conductive leg 16 outwardly and the inner conductive leg 14 inwardly. However, due to the C-shaped configuration of the workpiece portion 12, the net force acting on the workpiece portion 12 causes it to straighten out. As the C-shaped workpiece portion 12 straightens out, it expands against the inner surface 34 of the tubular member 32 with a predetermined forming force so as to permanently join the workpiece portion 12 of the annular forming coil 10 to the interior of the tubular member 32.

In the inventive method and apparatus, it is immaterial whether the hollow member is conductive or nonconductive. If the hollow member is conductive, the current pulse in the disposable forming coil will induce a circulating current in the hollow member. This circulating current will generate a magnetic force tending to oppose expansion of the disposable forming coil. However, due to the extremely short duration of the applied current pulse and the large energy loss inherent in inducing the circulating current in the hollow member, the effect of the opposing magnetic force is negligible. Further, even though the hollow member is conductive, there is no appreciable arcing between the disposable forming coil and the hollow member. The resistance between the outer conductive layer of the disposable forming coil and the inner surface of the hollow member is large enough to confine the current pulse exclusively to the disposable forming coil.

The magnitude of the forming force may be varied by adjusting the energy level and the duration of the current pulse applied to the conductive layers of the disposable forming coil. Depending upon the magnitude of the forming force, the inner surface of the hollow member may also be slightly deformed.

It is to be understood that the specific embodiment of the invention shown and described herein is merely illustrative and various modifications and variations thereof may be made without departing from the spirit and scope of the invention.

I claim:

1. In combination: a tubular member having an inner surface; an electromagnetic coil including a workpiece portion having a C-shaped configuration and disposed within the tubular member, the workpiece portion including inner and outer conducting strips connected at one end and separated by an insulating strip; and electrical energizing means connected to the other end of the conducting strips for passing a current pulse through the conducting strips to generate magnetic forces tending to separate the conductive strips so that due to its C-shaped configuration the workpiece portion of the electromagnetic coil is expanded against and joined to the inner surface of the tubular member.

References Cited

UNITED STATES PATENTS

| | | | |
|---|---|---|---|
| 3,088,200 | 5/1963 | Budsall et al. | 29—421 |
| 3,115,857 | 12/1963 | Pfanner | 29—421 |
| 3,171,014 | 2/1965 | Ducati | 29—421 |
| 3,333,328 | 8/1967 | Rushing | 29—421 |
| 3,387,476 | 6/1968 | Gunther | 72—56 |
| 3,434,194 | 3/1969 | Whittaker et al. | 29—470.1 XR |

JOHN F. CAMPBELL, Primary Examiner

R. B. LAZARUS, Assistant Examiner

U.S. Cl. X.R.

29—421, 470.1